(12) United States Patent
Liu et al.

(10) Patent No.: US 7,349,395 B2
(45) Date of Patent: Mar. 25, 2008

(54) SYSTEM, METHOD, AND COMPUTER PROGRAM PRODUCT FOR PARSING PACKETIZED, MULTI-PROGRAM TRANSPORT STREAM

(75) Inventors: Wenhong Liu, Bellevue, WA (US); Tuan D. Le, Redmond, WA (US); Matthijs A. Gates, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 10/602,415

(22) Filed: Jun. 23, 2003

(65) Prior Publication Data

US 2004/0258060 A1 Dec. 23, 2004

(51) Int. Cl.
*H04L 12/28* (2006.01)
(52) U.S. Cl. ....................... 370/392; 370/537
(58) Field of Classification Search ............... None
See application file for complete search history.

(56) References Cited

U.S. PATENT DOCUMENTS

| | | | |
|---|---|---|---|
| 5,913,038 A | | 6/1999 | Griffiths |
| 5,920,572 A | * | 7/1999 | Washington et al. ........ 370/535 |
| 6,097,380 A | | 8/2000 | Crites et al. |
| 6,229,801 B1 | | 5/2001 | Anderson et al. |
| 6,434,171 B1 | * | 8/2002 | Ishida ........................ 370/537 |
| 6,999,424 B1 | * | 2/2006 | Kovacevic et al. .......... 370/252 |
| 2001/0009548 A1 | * | 7/2001 | Morris ....................... 370/392 |
| 2001/0028780 A1 | * | 10/2001 | Na et al. ...................... 386/46 |
| 2001/0033619 A1 | * | 10/2001 | Hanamura et al. ..... 375/240.26 |
| 2002/0016969 A1 | | 2/2002 | Kimble |
| 2002/0048450 A1 | | 4/2002 | Zetts |
| 2002/0087969 A1 | | 7/2002 | Brunheroto |
| 2002/0166123 A1 | | 11/2002 | Schrader et al. |
| 2003/0002584 A1 | | 1/2003 | Campisano et al. |
| 2003/0035649 A1 | * | 2/2003 | Chung et al. ............... 386/111 |
| 2003/0055879 A1 | | 3/2003 | Glass et al. |

* cited by examiner

*Primary Examiner*—Edan Orgad
*Assistant Examiner*—Jung Park
(74) *Attorney, Agent, or Firm*—Lee & Hayes, PLLC

(57) ABSTRACT

Systems, methods, and computer program products for parsing a packetized, multi-program transport stream are disclosed. A packetized, multi-program transport stream is received in a demultiplexer. Program specific information is extracted from the program stream and displayed on a user interface. A user may select a program from the program stream for further processing. The user interface generates a signal indicative of the selected program, and the demultiplexer output is configured based on the selection signal.

24 Claims, 7 Drawing Sheets

SYSTEM, METHOD, AND COMPUTER PROGRAM PRODUCT FOR PARSING PACKETIZED, MULTI-PROGRAM TRANSPORT STREAM

TECHNICAL FIELD

The described subject matter relates to computing systems, and more particularly to a system, method, and computer program product for parsing a packetized, multiprogram transport stream.

BACKGROUND

MPEG-2 is a known data transport protocol adapted for multiplexing more than one data stream (e.g., video, audio, and data) to produce a single program, i.e., a logical grouping of video, audio and/or data streams. MPEG-2 provides a basic framework for integrated video, audio, and data services. Common uses for MPEG-2 include high definition television (HDTV), digital video broadcast (DVB), Advanced Television Systems Committee (ATSC), and other digital streaming applications.

An MPEG-2 data stream must be decoded before the content in the data stream may be presented to a user. Many broadcasters of MPEG-2 data streams develop proprietary hardware and software systems to decode their MPEG-2 data stream. For example, cable and satellite television broadcasters typically provide a set-top box to decode their broadcast stream before presenting it on a television screen.

In addition, many consumer electronic devices, e.g., digital camcorders and DVD players, generate output that is transmitted in an MPEG-2 data stream. The output may be processed for display by an application executing on a computing device, and may be displayed on a monitor and/or speakers connected to the computing device. Because an MPEG-2 data stream may include content from multiple, different sources, and because the content might change over time, it is necessary to parse the data stream during processing to permit an application to identify and process the desired data from the data stream.

SUMMARY

In an exemplary implementation, a method of computing is provided. Portions of a packetized, multi-program transport stream are received. The transport stream includes program specific information about data in the packetized, multi-program transport stream. At least one program identifier is extracted from the program specific information and provided to an external application.

In another exemplary implementation, a method of processing a packetized, multi-program transport stream is provided. Program specific information is extracted from a packetized, multi-program transport stream and parsed to obtain at least one program identifier associated with a program in the packetized, multi-program transport stream. An output of a demultiplexer is configured based on at least one program identifier.

In another exemplary implementation, a method of computing is provided. A plurality of program identifiers are retrieved from a received MPEG-2 transport stream and presented in a user interface. A signal indicating a selected program identifier is received from the user interface, and an MPEG-2 demultiplexer is configured based on the selected program identifier.

In an exemplary implementation, the packetized, multi-program transport stream is embodied as an MPEG-2 transport stream. A parser filter retrieves program specific information (PSI) from the MPEG-2 transport stream. Initially, the parser filter retrieves a program association table (PAT), the contents of which are used to obtain information from the program map tables (PMTs) for one or more programs in the transport stream. The parser filter forwards information extracted from the PMT tables in transport stream to an external application, which may display the PMT information in a suitable user interface. In addition, the PMT information may be used to configure the output of an MPEG-2 demultiplexer. This arrangement permits monitoring of the contents of an MPEG-2 transport stream and dynamic configuration of a MPEG-2 multiplexer to accommodate changes in the program information contained in the MPEG-2 transport stream.

DETAILED DESCRIPTION

Exemplary methods, systems, and devices are disclosed for parsing a packetized, multi-program transport stream to obtain information about specific programs within the program stream. The obtained information may be transmitted to an external application, which may display the information in a user interface. In addition, the obtained information may be used to select content from the data stream.

Exemplary Computing System

Figure 1:
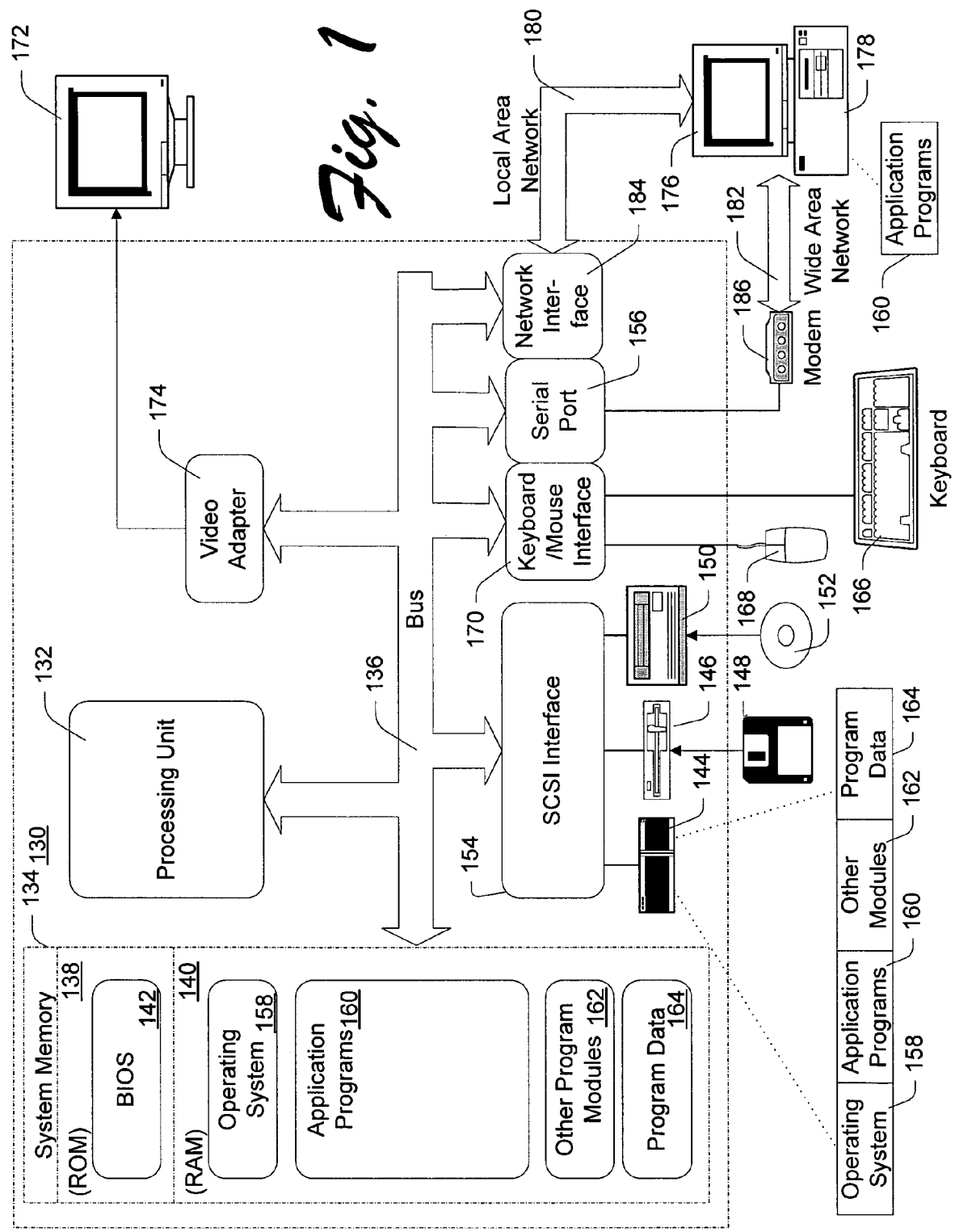
FIG. 1 is a schematic illustration of an exemplary computing device that can be utilized to implement one or more described embodiments.

FIG. 1 is a schematic illustration of an exemplary computing device 130 that can be utilized to implement one or more described embodiments. Computing device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computing device 130, such as during start-up, is stored in ROM 138.

Computing device 130 further includes a hard disk drive 144 for reading from and writing to a hard disk 144, a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computing device 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computing device 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computing device 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computing device 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computing device 130 is connected to the local network 180 through a network interface or adapter 184. When used in a WAN networking environment, computing device 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computing device 130, or portions thereof, may be stored in the remote memory storage device. It will be appreciated that the network connections shown are exemplary and other means of establishing a communications link between the computers may be used.

Generally, the data processors of computing device 130 are programmed by means of instructions stored at different times in the various computer-readable storage media of the computer. Programs and operating systems may be distributed, for example, on floppy disks, CD-ROMs, or via a communication network such as, e.g., the Internet. From there, they are installed or loaded into the secondary memory of a computer. At execution, they are loaded at least partially into the computer's primary electronic memory. Embodiments described herein include these and other various types of computer-readable storage media when such media contain instructions or programs for implementing the steps described below in conjunction with a microprocessor or other data processor. Embodiments described herein also include the computer itself when programmed according to the methods and techniques described below.

Exemplary Coding and Decoding of MPEG-2 Transport Stream

Figure 2:
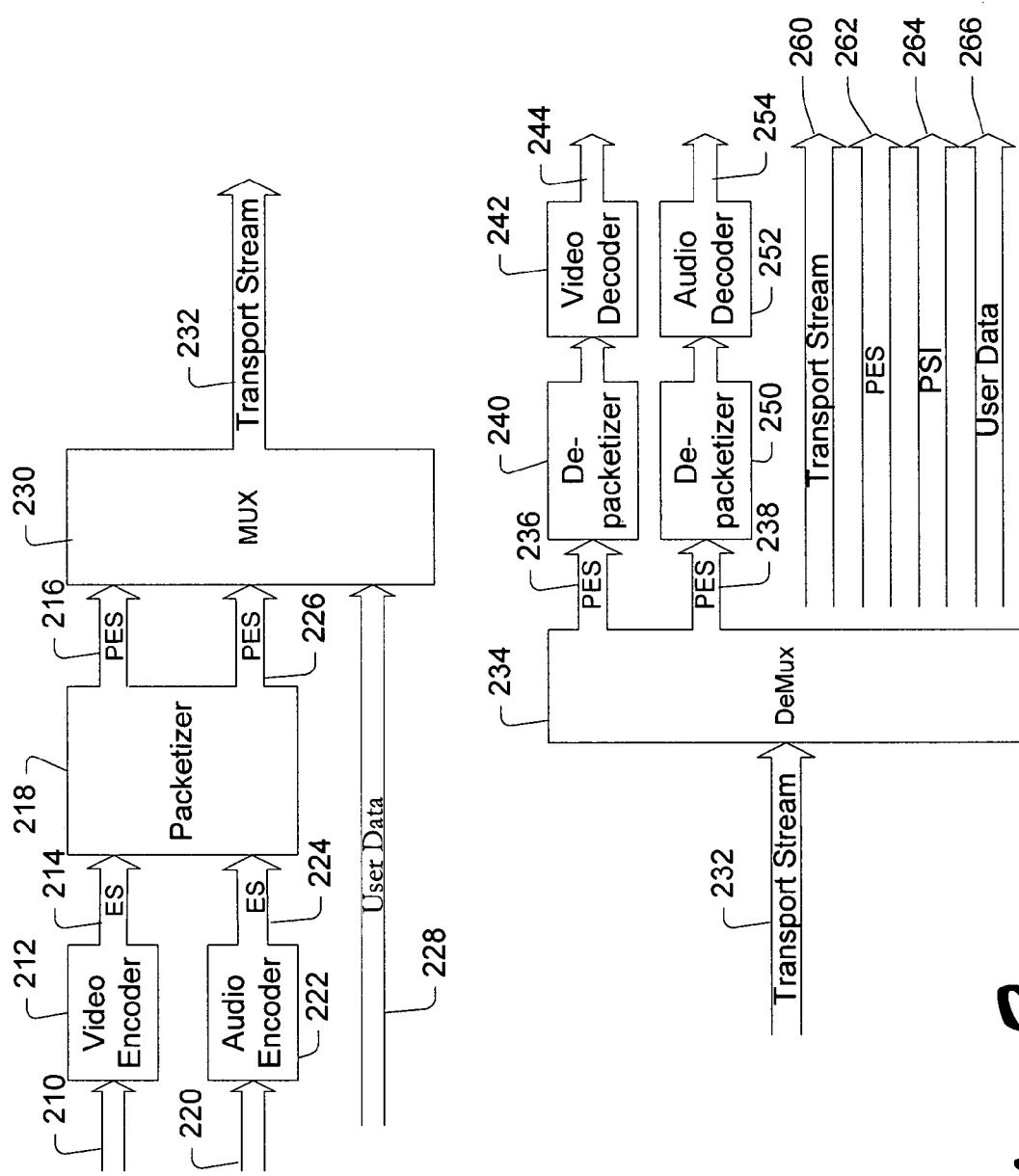
FIG. 2 is a schematic illustration of encoding and decoding an MPEG-2 data stream.

FIG. 2 is a schematic illustration of an exemplary encoding and decoding an MPEG-2 data stream. While exemplary embodiments are described specifically with reference to an MPEG-2 transport stream, the techniques disclosed herein are generally applicable to packetized, multi-program transport streams. MPEG-2 multiplexing starts with one or more bitstreams, called elementary streams (ES), that contain video, audio, or other data. For example, a video ES contains compressed video frames, plus sequence headers, group-of-picture (GOP) headers, and anything else needed by the decoder to decode the stream. Referring to FIG. 2, a video source 210 outputs a video stream to a video encoder 212, which encodes the video stream and outputs a video ES 214. Similarly, an audio source 220 outputs an audio stream to an audio encoder 222, which encodes the audio stream and outputs an audio ES.

An ES is broken up into packets, forming a packetized elementary stream (PES). In FIG. 2, the video ES 214 and audio ES 224 are input to a packetizer 218, which packetizes the streams and outputs a video PES 216 and an audio PES 226. PES packets may be of variable length. The contents of the packets are referred to as the payload. Each PES packet also includes a header. The multiplexer assigns each PES a 1-byte stream ID; individual PES packets are identified by the stream ID in the packet header. For audio streams, the stream ID has the form 110xxxxx. For video streams, the stream ID has the form 1110yyyy. The video PES 216, audio PES 226, and user data 228 are input to a multiplexer 230, which multiplexes the data streams and generates an output stream 232.

The MPEG-2 standard defines two ways to deliver packetized elementary streams: program streams and transport streams. Program streams are designed for environments that are relatively error free, such as local file storage. In a program stream, the PES packets are multiplexed and organized into units called packs. All of the PES streams in a program stream are synchronized to the same clock.

Transport streams (TS) are designed for unreliable or error-prone environments, such as network broadcasts. An MPEG-2 transport stream can contain multiple programs that are synchronized to different clocks. A transport stream adds a second layer of packetizing—the PES streams are broken into transport stream packets, with a fixed size of 188 bytes per packet. Transport stream packets can also contain program information, described below. In this document, the term "transport stream" is used generically to refer to both program streams and transport streams.

Each transport stream packet has a 4-byte header. The multiplexer 230 assigns a packet ID (PID) to each PES stream or program information stream within the transport stream. If a transport stream contains multiple programs, then the stream IDs might not be unique, but the PID assignments are unique within the transport stream.

In FIG. 2, the multiplexer outputs an MPEG-2 transport stream, which is transmitted via a suitable communication channel (not shown). The particular communication channel is not important, and the communication channel may comprise any suitable communication channel, e.g., a wireless or satellite communication link, an electronic or electro-optical communication channel, a local area network (LAN) or a wide area network (WAN), a communication bus, or combinations thereof.

In the decoding process, the MPEG-2 transport stream 232 is received in a demultiplexer 234, which demultiplexes the transport stream 232 and outputs a video PES 236 and an audio PES 238. The video PES 236 is input to a depacketizer 240, the output of which is directed to a video decoder 242, which decodes the video stream and outputs a video bitstream 244. Similarly, the audio PES 238 is input to a depacketizer 250, the output of which is directed to an audio decoder 252, which decodes the video stream and outputs a video bitstream 254. The video bitstream 244 may be displayed on a suitable device, e.g., a monitor, and the audio bitstream 254 may be played on a suitable device, e.g., speakers.

The multiplexer may be configured to generate additional outputs. In the exemplary embodiment depicted in FIG. 2, the multiplexer 234 is configured to output an MPEG-2 transport stream 260, a PES 262, program specific information (PSI) 264, and user data 266.

An MPEG-2 transport stream can carry multiple programs, i.e., bitstreams from multiple, different sources. Therefore, there needs to be a way to associate PES packets with the programs to which they belong. This is accomplished using data in the transport stream that identifies the individual program streams. Collectively, this data is referred to Program Specific Information (PSI). PSI data is multiplexed into packets when MPEG-2 data is encoded. PSI data includes a program association table (PAT) and a program map table (PMT).

Figure 3:
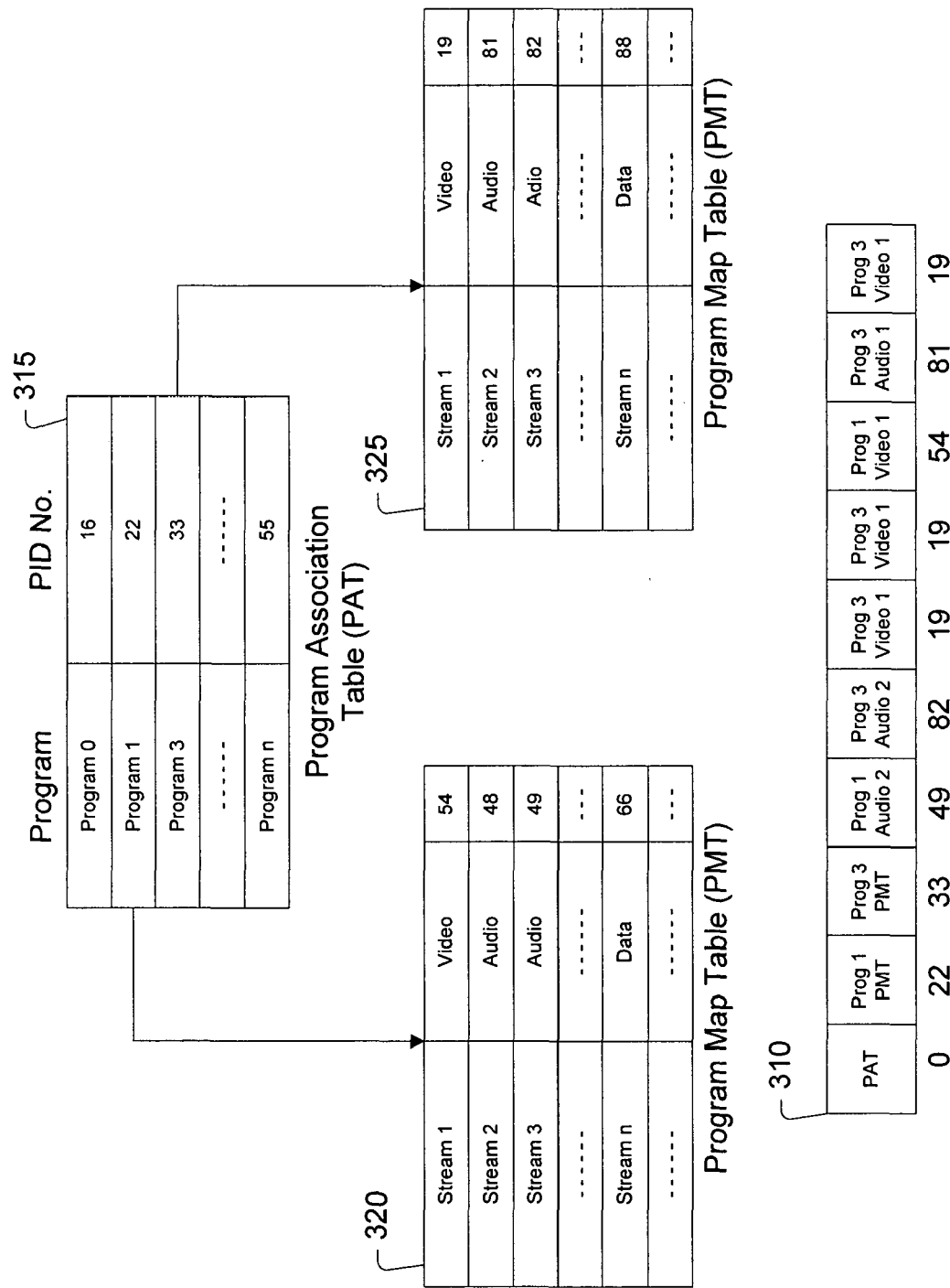
FIG. 3 is a schematic illustration of a portion of an exemplary MPEG-2 transport stream and a program association table (PAT) and program map tables (PMTs) associated therewith.

FIG. 3 is a schematic illustration of a portion of an exemplary MPEG-2 transport stream 310 and a PAT 315 and PMTs 320 and 325 contained therein. The transport stream 310 comprises a sequence of packets, each of which is identified by a PID, which appears below the packets in FIG. 3. The transport stream includes a PAT 315, which is always assigned to PID zero (0). Each entry in the PAT is a PID that identifies a PMT packet for a specific program in the transport stream. By way of illustration, an entry in PAT 315 indicates that the PMT for program 1 is contained in the packet with PID 22. Similarly, an entry in PAT 315 indicates that that the PMT for program 3 is contained in the packet with PID 33.

Each PMT includes a list of streams for the program and a corresponding table entry gives the PID for the each stream. The PMT also includes a code that identifies the stream type, e.g., video, audio, data, etc. By way of example, FIG. 3 illustrates that the PMT 320 for program 1 comprises a video stream in PID 54, an audio stream in packet 48, another audio stream in packet 49, and a data stream in packet 66. Similarly, PMT 325 for program 3 comprises a video stream in PID 19, an audio stream in PID 81, an audio stream in PID 82, and a data stream in PID 88.

ISO/IEC 13818-1 defines some standard stream types, an abbreviated list of which is provided in the following table.

| stream_type | Description |
|---|---|
| 0x01 | MPEG-1 video |
| 0x02 | MPEG-2 video |
| 0x03 | MPEG-1 audio |
| 0x04 | MPEG-2 audio |
| 0x05 - 0x7F | . . . |
| 0x80 - 0xFF | User private |

Other standards that are based on MPEG-2, such as ATSC, may define additional stream types in the "user private" range. For example, ATSC defines 0x81 as Dolby AC-3 audio. In addition, PSI can include Conditional Access Tables (CAT) and Network Identification Tables (NIT).

Exemplary Architecture

Figure 4:
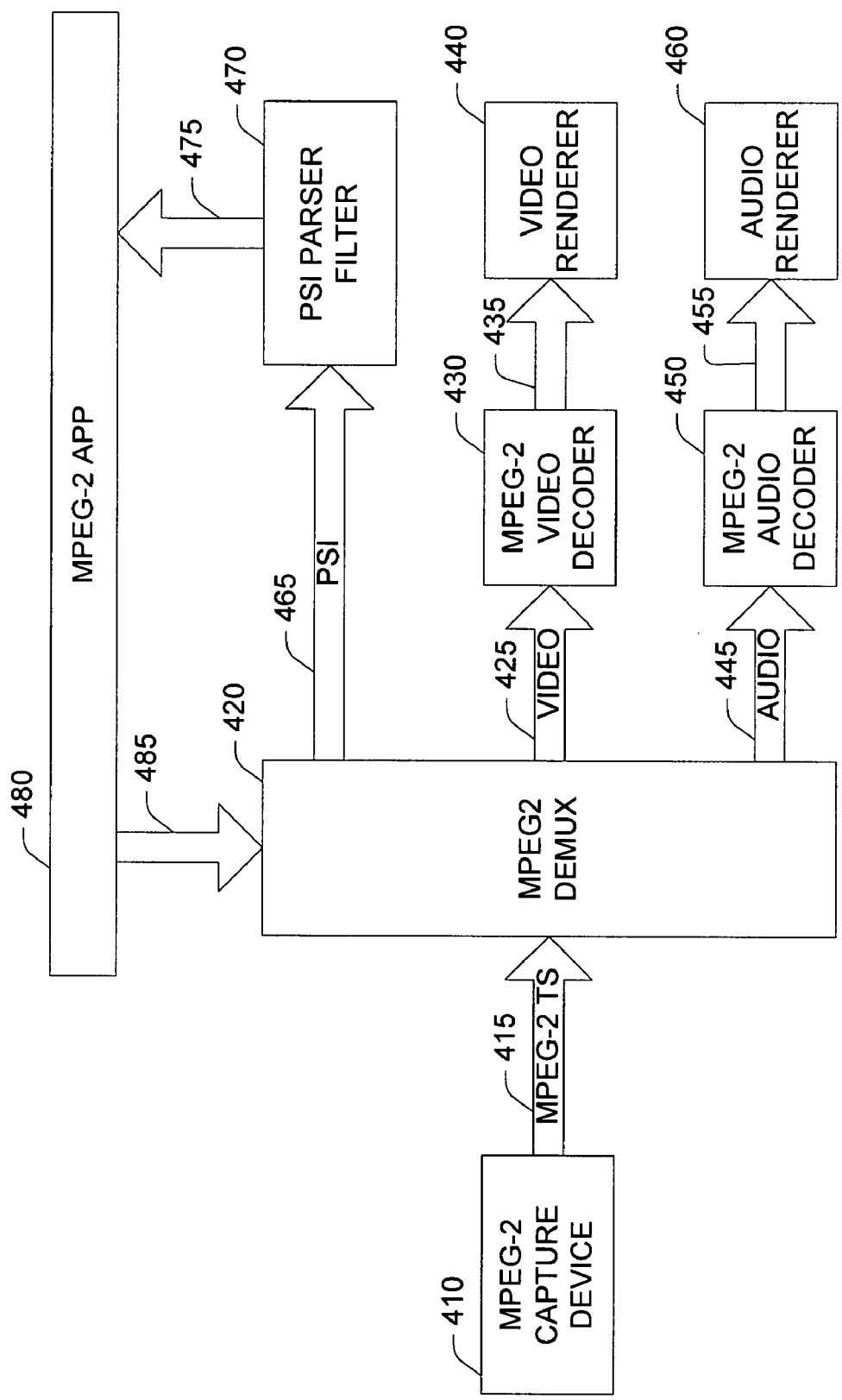
FIG. 4 is a schematic illustration of an exemplary operating environment for demultiplexing an MPEG-2 transport stream.

FIG. 4 is a schematic illustration of an exemplary architecture for demultiplexing an MPEG-2 transport stream. Referring to FIG. 4, an MPEG-2 capture device 410 captures an MPEG-2 transport stream 415. The particular implementation of the MPEG-2 capture device is not critical. Exemplary MPEG-2 capture devices include digital TV tuners, MPEG-2 Digital VHS players, DVD players, or digital camcorders.

The MPEG-2 transport stream 415 is directed to an MPEG-2 demultiplexer 420. The MPEG-2 demultiplexer is configurable to demultiplex the MPEG-2 transport stream and to generate a plurality of output streams. In the exemplary embodiment depicted in FIG. 4, the MPEG-2 demultiplexer is configured to generate a video output stream 425 and an audio output stream 445. The video output stream 425 is directed to an MPEG-2 video decoder, which decodes the video stream to generate a video bitstream output 435, which is directed to a video renderer 440. The video bitstream may be rendered for display on a suitable monitor. The audio stream 445 is directed to an MPEG-2 audio decoder 450, which decodes the audio stream to generate an audio bitstream output 455, which is directed to an audio renderer. The audio bitstream may be rendered for playback on, e.g., speakers.

MPEG-2 demultiplexer 420 may also be configured to output PSI on an output 465. The PSI is directed to a PSI parser 470, which parses the PSI received in the MPEG-2 transport stream and extracts at least one program identifier associated with data in the MPEG-2, which may then be provided to an external application 480 over a communication link 475. External application 480 may include an application that utilizes an MPEG-2 transport stream, e.g., a DVD player or other multimedia player. The external application 480 may display the program identifier(s) received from the PSI parser 470 and may use the program identifier(s) to configure and/or reconfigure the MPEG-2 demultiplexer 420 to output the video, audio, and/or data programs of interest to the external application, e.g., by passing a command over communication link 485.

Exemplary Parsing Operation

Figure 5:
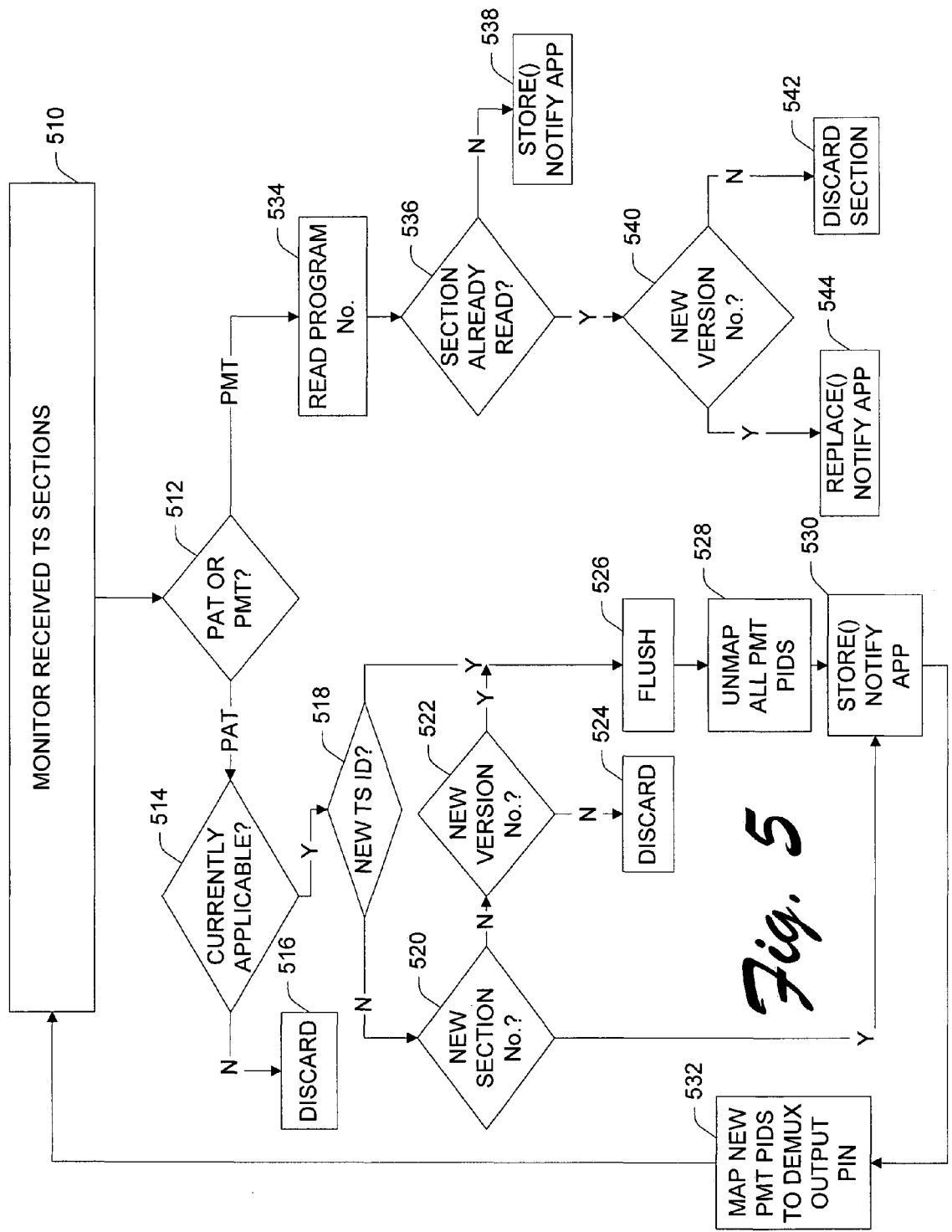
FIG. 5 is a flowchart illustrating an exemplary parsing operation for a packetized, multi-program transport stream.

FIG. 5 is a flowchart illustrating an exemplary parsing operation performed by the parser filter 470, although some operations are performed by the external application 480. In general, when a parser filter begins monitoring an MPEG-2 transport stream, the parser filter initially retrieves a PAT, i.e., a packet having a PID of zero (0). In an exemplary embodiment the parser filter populates a memory location with PAT information retrieved from the transport stream. The information from the PAT may then be used to retrieve, from the transport stream, PMT information for each of the programs in the transport stream. The retrieved PMT information may also be stored in a suitable memory location. After retrieving the PAT and PMT information, the parser filter monitors the transport stream and updates the PAT and PMT information when the program information in the transport stream changes, e.g., when programs are added, deleted, or PIDs are reassigned. Content from the PAT and PMT information may be transmitted to an external application, which may display the information on a suitable user interface. The user may select which program(s) to process, and the external application maps the audio and video PIDs of the selected program to the output pins of the demultiplexer.

The process illustrated in FIG. 5 may be implemented in the architecture depicted in FIG. 4 as a series of logical operations that execute on a computer processor. The process may be a continuous process or a may be executed on a periodic basis. Referring to FIG. 5, at step 510 the parser filter 470 monitors the transport stream sections received by the demultiplexer 420. Parser filter 470 is configured to retrieve transport stream packets with a PID of zero, i.e., a PAT in the transport stream, and to retrieve transport stream packets with a PID that is mapped to a PMT in the PAT.

At step 512 the PID of a retrieved section is analyzed to determine whether the PID is a PAT or a PMT. When the PSI parser filter 470 is initially instantiated it will lack information about the contents of the transport stream. Therefore, after its initial instantiation, the first retrieved packet will be a PAT, i.e., a section that has a PID of zero (0). Accordingly, at operation 512, control is passed to operation 514, which determines whether the PAT is currently applicable. In an exemplary embodiment, this may be determined by checking the current_next_indicator in the PAT table. If the PAT is not currently applicable, then the PAT is discarded at operation 516 and processing of the PAT is terminated.

By contrast, if the PAT is currently applicable, then control passes to operation 518, which determines whether the transport stream identifier is new. In an exemplary embodiment, this may be performed by storing the transport stream identifier in a suitable memory location and comparing the received transport stream identifier with the stored transport stream identifier. If the transport stream identifier is new, then at operation 526 the existing PAT and PMT information (See, FIG. 3) maintained by the parser filter is deleted. At operation 528, all the PMT PIDs are unmapped. In an exemplary embodiment, this operation is performed by the external application 480. At operation 530 the new PAT is stored in memory and the external application 480 is notified that a new transport stream has been received.

At operation 532, the new PMT PIDs are mapped to the output pins of the demultiplexer 420. In an exemplary embodiment, this operation is performed by the external application 480.

If, at operation 518 it is determined that the transport stream identifier is not new, then control passes to operation 520, which determines whether the section number is new. In an exemplary embodiment, this may be performed by storing the section number in a suitable memory location and comparing the received section number with the stored section number. If the section number is new, then control passes to operation 530, and the new section number is stored in memory and the external application 480 is notified that a new PAT section has been received. Operation 532 is executed as described above.

By contrast, if the section number is not new, then control passes to operation 522, which determines whether the version number is new. In an exemplary embodiment, this may be performed by storing the version number in a suitable memory location and comparing the received version number with the stored version number. If the version number is not new, then the PAT is discarded at operation 524. However, if the version number is new, the operations 526 through 632 are executed, as described above.

Referring again to operation 512, if the retrieved section represents a PMT, then control passes to operation 534, and the parser filter 470 reads the program number of the retrieved section. At operation 536 it is determined whether the section was already read. It will be appreciated that the same section may be transmitted multiple times in the transport stream, e.g., for error correction purposes. This is illustrated in FIG. 3, which shows that section having PID 19 was transmitted three times. In an exemplary embodiment, this may be performed by storing the section number in a suitable memory location and comparing the received section number with the stored section number. If the section was not already read, then at operation 538 the new section is stored and the external application 480 is notified of the new section.

If at operation 536 it is determined that the section has already been read, then control passes to step 540, which determines whether the section has a new version number. In an exemplary embodiment, this may be performed by storing the version number in a suitable memory location and comparing the received version number with the stored version number. If the version number is not new, then the section may be discarded, at operation 542. However, if the section number is new, then at operation 544 the section is replaced and the external application 480 is notified of the replaced section.

By executing the operations outlined in FIG. 5, the parser filter obtains information from the PAT and PMT tables in the transport stream. Optionally, the parser filter may build, populate, and maintain a PAT table and PMT tables representing the contents of a received MPEG-2 transport stream. This information may be passed to external application 480. In an exemplary embodiment, external application 480 comprises a user interface for displaying the program information in the MPEG-2 transport stream, and uses program information to configure the output pins of the demultiplexer 420.

Exemplary Application

Microsoft Corporation of Redmond, Wash., USA, has developed a series of application programming interfaces (APIs) that define a media-streaming architecture for the Microsoft "WINDOWS" operating system. This architecture is referred to commercially as the "DIRECTSHOW" application programming interface. The platform enables developers to write applications that can perform high-quality video and audio playback or capture.

The building blocks of "DIRECTSHOW" applications are software components called filters. A filter is a software component that performs some operation on a multimedia stream. For example, filters can read files, get video from a video capture device, decode various stream formats, including MPEG-2 streams, and pass data to a graphics or sound card. Filters can receive input and produce output. For example, if a filter decodes MPEG-2 video, then the input is an MPEG-2 encoded bitstream and the output is a series of uncompressed video frames. An application performs a task by connecting chains of filters together, so that the output from one filter becomes the input for another. A set of connected filters is called a filter graph.

In an exemplary embodiment, the architecture illustrated in FIG. 4 and the process illustrated in FIG. 5 may be implemented using "DIRECTSHOW" application programming interfaces. The "DIRECTSHOW" application programming interfaces are based on Component Object Model (COM) programming techniques, which are familiar to those skilled in the art. The "DIRECTSHOW" application programming interfaces provide the components necessary to decode MPEG transport streams. Application developers can build MPEG applications by instantiating and connecting components using "DIRECTSHOW" application programming interfaces. One skilled in the art will be familiar with the procedures for instantiating and executing "DIRECTSHOW" applications. Accordingly, only pertinent portions of application development are described herein.

Figure 6A:
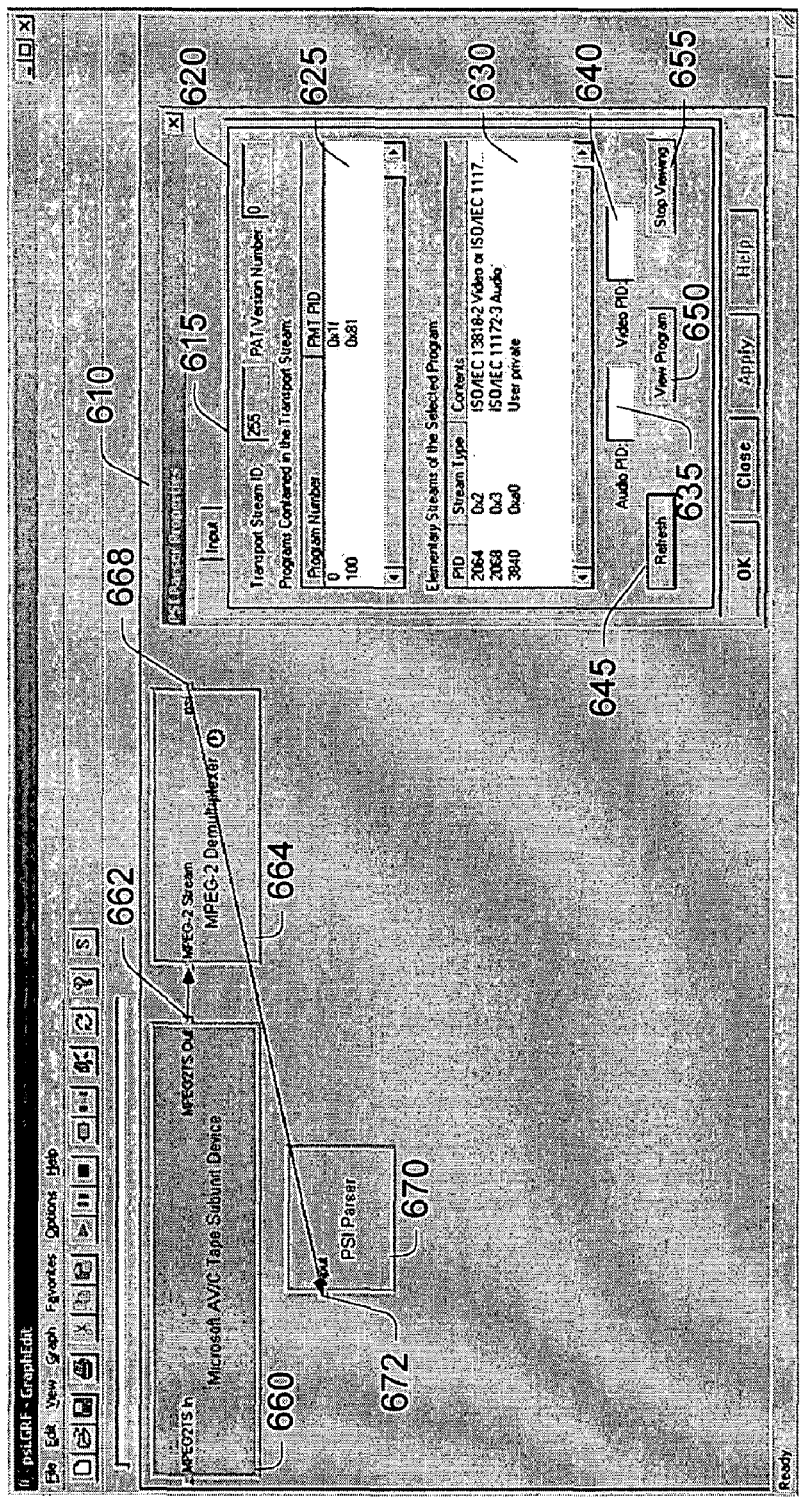
FIGS. 6A-6B are screen shots of an exemplary applications implemented using the "DIRECTSHOW" application programming interfaces.

FIG. 6A is a screen shot of an exemplary application constructed using the "DIRECTSHOW" application programming interfaces and the GraphEdit development tool. Referring to FIG. 6A, a source 660 generates an MPEG-2 transport stream that is output on output pin 662. In the exemplary embodiment depicted in FIG. 6A, the source is an AV/C tape subunit, but the particular source is not critical.

An MPEG-2 demultiplexer 664 receives the MPEG-2 transport stream on an input pin 666. MPEG-2 demultiplexer 664 may be embodied as a filter that receives an input stream, demultiplexes the input stream, and generates an output on one or more output pins. The demultiplexer filter is instantiated with no output pins. The IMpeg2Demultiplexer::CreateOutputPin method may be used to create an output pin 668 on the demultiplexer filter. Alternatively, the property page on the demultiplexer may be used to create an output pin 668 with media type MPEG-2 PSI. This pin will deliver the PAT and PMT sections, and to map PID 0x00 to the output pin 668. The content type may be set to MPEG2 PSI Sections.

A PSI parser filter 670 is instantiated and has an input pin 672 connected to an output pin 668 of the demultiplexer 664. When the graph is executed, the PSI Parser filter 670 receives Program Specific Information (PSI) from an MPEG-2 transport stream and extracts program information from the PAT and PMTs in the transport stream. As the PSI parser filter 670 decodes the PAT sections, the PMT PIDs are mapped to the output pin 668 on the demultiplexer, so that the PSI parser filter receives the PMT sections.

After the PSI parser filter 670 retrieves Program Specific Information (PSI) tables from the MPEG-2 transport stream input to the demultiplexer 664, the PSI tables may be processed as described with reference to FIG. 5. In an exemplary embodiment, a user interface 610 is provided to display program information from the transport stream. User interface 610 includes a first display window 615 that displays the transport stream ID associated with the transport stream, and a second display window 620 that displays the version number of the PAT. User interface 610 further includes a third display window 625 that displays the programs contained in the transport stream and the PMT PID for each program. This information may be derived from the PAT table passed from the parser filter 470. User interface 610 further includes a fourth display window 630 for displaying the elementary streams of a program selected from the first window 525, an edit box 635 for inputting an audio PID, and an edit box 640 for inputting a video PID. User interface 610 also includes a Refresh button 645 that permits a user to prompt a reload of the data from the transport stream, a View Program button 650 that allows a user to view a program selected from the first display window 615, and a Stop Viewing button 655 that allows a user to stop viewing a selected program.

In operation, a user may enter an audio PID number in the audio PID edit box 635, and the video PID number in the Video PID edit box 640. The user may then click the View Program button 650. The PSI parser filter 670 will configure the output pins on the demultiplexer 664 to match the program stream information and render the pins.

In an alternate embodiment, the PSI parser 670 may be used by an application to programmatically configure the output pins of the demultiplexer 664. To use the PSI Parser filter 670 in an application, a filter graph from an MPEG-2 source to the MPEG-2 demultiplexer is created. Next, an output pin on the demux for the PSI data is created and PID 0x00, which is reserved for PAT sections, is mapped to this pin, as shown in the following code fragment:

```
        // Set the media type to MPEG-2 table sections.
    AM_MEDIA_TYPE mt;
    ZeroMemory(&mt, sizeof(AM_MEDIA_TYPE));
    mt.majortype= SDATAFORMAT_TYPE_MPEG2_SECTIONS;
    // Create the pin.
    IPin *pPsiPin;
    hr = pDemux->CreateOutputPin(&mt, L"PSI", &pPsiPin);
    if (SUCCEEDED(hr))
    {
        // Map to PID 0.
        ULONG Pid = 0x00;
        hr = pPid->MapPID(1, &Pid, MEDIA_MPEG2_PSI);
    }
```

The PSI Parser filter is added to the graph and connected to the output pin on the demultiplexer 664. The PSI parser filter 670 supports a custom interface, IMpeg2PsiParser, for retrieving the PSI information from a transport stream. The IMpeg2PsiParser interface exposes the following methods.

| Method | Description |
| --- | --- |
| FindRecordProgramMapPid | Finds the Program Map Table (PMT) PID for a program, given the program number. |
| GetCountOfElementaryStreams | Retrieves the number of elementary streams in a specified program. |
| GetCountOfPrograms | Retrieves the number of programs in the transport stream. |
| GetPatVersionNumber | Retrieves the version_number field from the Program Association Table (PAT). |
| GetPmtVersionNumber | Retrieves the version_number field from a specified PMT. |
| GetRecordElementaryPid | Retrieves the PID assignment for a specified elementary stream in a program. |
| GetRecordProgramMapPid | Retrieves the PID assignment for a specified PMT. |
| GetRecordProgramNumber | Retrieves the program number for a specified program. |
| GetRecordStreamType | Retrieves the stream type for a specified elementary stream in a program. |
| GetTransportStreamId | Retrieves the transport_stream_id field from the PAT. |

The PSI Parser queries the IMpeg2PsiParser interface. When the graph is executed and a new PAT or PMT section is received, an EC_PROGRAM_CHANGED signal is generated by the PSI Parser filter. When an EC_PROGRAM_CHANGED event is received, IMpeg2PsiParser methods may be invoked to retrieve the available PSI information.

By way of example, the GetCountOfPrograms method may be used to retrieve the number of programs, as illustrated in the following code fragment.

int NumProgs=0;
    hr=pPsi->GetCountOfPrograms(&NumProgs);

Similarly, the GetRecordProgramNumber method may be used to get the program number for a specific program, as illustrated in the following code fragment.

```
WORD ProgNum = 0;
for (int i = 0; iProgram < NumProgs; i++)
{
   hr = pPsi->GetRecordProgramNumber(i, &ProgNum);
   ...
}
```

The program number may be used to obtain the PMT entries for individual programs. The GetCountOfElementaryStreams method may be used to get the number of elementary streams in a program, as illustrated in the following code fragment.

ULONG cElemStreams=0;
    Hr=pPsi->GetCountOfElementaryStreams(ProgNum, &cElemStreams);

For each elementary stream, the GetRecordElementaryPid method returns the PID, and the GetRecordStreamType method returns the stream type, as illustrated in the following code fragment.

```
BYTE ESType = 0;
WORD ESPid = 0;
for (ULONG j = 0; j < cElemStreams; j++)
{
   hr = pPsi->GetRecordElementaryPid(ProgNum, j, &ESPid);
   hr = pPsi->GetRecordStreamType(ProgNum, j, &ESType);
}
```

The PID and the stream type enable a user to programmatically configure output pins on the MPEG-2 Demultiplexer. To create an output pin, a user may call the IMpeg2Demultiplexer::CreateOutputPin method, which creates a new output pin on the demultiplexer 664. Next, one or more stream IDs are assigned to the new output pin. For transport streams, query the pin for IMPEG2PIDMap and call IMPEG2PIDMap::MapPID. The MPEG-2 Demultiplexer can create new pins and new PID mappings while the graph is running, but the graph should be stopped to connect pins.

Figure 6B:
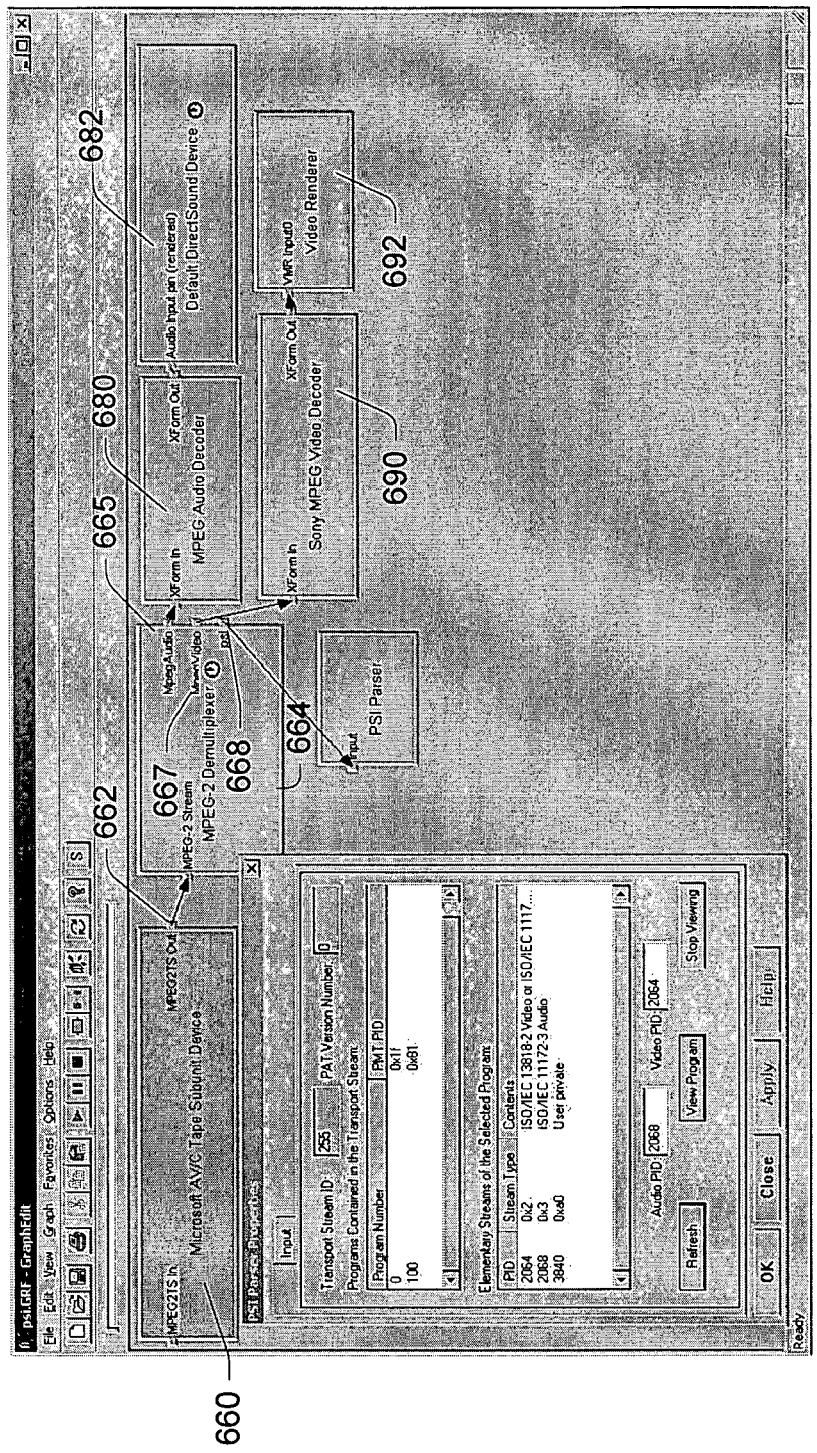

FIG. 6B is a screen shot of the application of FIG. 6A after a program has been selected. An audio output pin 665 and a video output pin 667 have been configured to output the audio and video streams, respectively, of the selected program. The audio stream may be input to an audio decoder 680, which decodes the stream, and then to a DirectSound Device 682, which plays the audio stream. The video stream may be input to a video decoder 690, which decodes the stream, and then to a video rendering module 692 to render the video stream.

CONCLUSION

Described herein are exemplary methods for parsing a packetized, multi-program transport stream and for retrieving program-specific information associated with programs in the transport stream. The program-specific information may be presented in a user interface, which may receive a signal from a user to select a particular program for further processing. The signal is processed and may be used to configure the output pins of a demultiplexer. Alternatively, the method may be implemented to programmatically configure the output pins of the demultiplexer. The methods may be executed as a continuous process, so that changes in the program stream are detected substantially in real-time. The demultiplexer may be reconfigured to accommodate the changes.

One skilled in the art will recognize that the methods described herein can readily be extended to process sections that are format-specific, e.g., DVB or ASTC.

The methods described herein may be embodied as logic instructions written on a computer-readable medium. These logic instructions may be executed by the processor of a computing device to configure the computing device as an apparatus that performs the described methods.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of computing, comprising
   receiving portions of a packetized, multi-program transport stream including program specific information about data in the packetized, multi-program transport stream;
   extracting, from the program specific information, at least one program identifier associated with data in the packetized, multi-program transport stream;
   retrieving from the program identifier at least one program association table;
   retrieving from the program association table at least one program map table; and
   providing the extracted program association table and program map table to an external application, wherein the external application retrieves transport stream packets that are mapped to the program map table and configures a demultiplexer output pins to output at least one program of interest from the retrieved transport stream packets.

2. The method of claim 1, wherein receiving portions of a packetized, multi-program transport stream including program specific information about data in the packetized, multi-program transport stream comprises monitoring the demultiplexer.

3. The method of claim 1, wherein extracting, from the program specific information, at least one program identifier associated with data in the packetized, multi-program transport stream comprises retrieving from the packetized, multi-program transport stream, data that identifies the multiple programs in the transport stream.

4. The method of claim 3, wherein the packetized, multi-program transport stream is an MPEG-2 transport stream.

5. The method of claim 1, wherein providing the extracted program identifier to an external application comprises presenting the program identifier in an application program interface accessible by the external application.

6. A computer-readable medium having computer-executable instructions for performing the method recited in claim 1.

7. A method of processing a packetized, multi-program transport stream, comprising:
 extracting program specific information from the packetized, multi-program transport stream;
 parsing the program specific information to obtain at least one program identifier associated with a program in the packetized, multi-program transport stream;
 retrieving from the program identifier at least one program association table;
 retrieving from the program association table at least one program map table;
 configuring an output of a demultiplexer based on the program association table and program map table, wherein configuring an output of a demultiplexer based on the program association table and program map table comprises mapping the program identifier to an output pin of the demultiplexer.

8. The method of claim 7, wherein extracting program specific information from the packetized, multi-program transport stream invoking an application programming interface to retrieve program specific information from the demultiplexer.

9. The method of claim 7, wherein the packetized, multi-program transport stream is an MPEG-2 transport stream.

10. A computer-readable medium having computer-executable instructions for performing the method recited in claim 7.

11. A method of computing, comprising:
 obtaining a plurality of program identifiers from a received MPEG-2 transport stream; and
 presenting the plurality of program identifiers in a user interface;
 receiving, from the user interface, a signal indicating a program identifier selected from the plurality of program identifiers in the MPEG-2 transport stream;
 retrieving from the program identifier at least one program association table;
 retrieving from the program association table at least one program map table; and
 configuring a MPEG-2 demultiplexer based on the selected program association table and program map table to output transport stream packets that are mapped to the program map table, wherein configuring an MPEG-2 demultiplexer based on the selected program association table and program map table comprises mapping an audio stream from the selected program to an audio output pin of the demultiplexer.

12. The method of claim 11, wherein configuring an MPEG-2 demultiplexer based on the selected program identifier comprises mapping a video stream from the selected program to a video output pin of the multiplexer.

13. A computer-readable medium having computer-executable instructions for performing the steps recited in claim 11.

14. An apparatus comprising:
 means for receiving portions of a packetized, multi-program transport stream including program specific information about data in the packetized, multi-program transport stream;
 means for extracting, from the program specific information, at least one program identifier associated with data in the packetized, multi-program transport stream;
 means for retrieving from the program identifier at least one program association table;
 means for retrieving from the program association table at least one program map table;
 means for providing the extracted program association table and program map table to an external application, wherein the external application retrieves transport stream packets that are mapped to the program map table and configures a demultiplexer output pins to output at least one program of interest from the retrieved transport stream packets.

15. The apparatus of claim 14, wherein the means for receiving portions of a packetized, multi-program transport stream including program specific information about data in the packetized, multi-program transport stream comprises a demultiplexer filter implemented as a software object in a filter graph.

16. The apparatus of claim 14, wherein the means for extracting, from the program specific information, at least one program identifier associated with data in the packetized, multi-program transport stream comprises a parser filter implemented as a software object in a filter graph.

17. The apparatus of claim 16, wherein the parser filter supports an API for retrieving program specific information from the transport stream.

18. The apparatus of claim 14, wherein the external application comprises a user interface for displaying portions of the extracted program information.

19. A computer system, comprising:
 a display;
 a user-input device;
 a processor capable of executing logic instructions; and
 a computer readable medium comprising logic instructions for:
  receiving portions of a packetized, multi-program transport stream including program specific information about data in the packetized, multi-program transport stream;
  extracting, from the program specific information, at least one program identifier associated with data in the packetized, multi-program transport stream;
  retrieving from the program identifier at least one program association table;
  retrieving from the program association table at least one program map table; and
  providing the extracted program association table and program map table to an external application, wherein the external application retrieves transport stream packets that are mapped to the program map table and configures a demultiplexer output pins to output at least one program of interest from the retrieved transport stream packets.

20. A computer system, comprising:
 a display;
 a user-input device;
 a processor capable of executing logic instructions; and
 a computer readable medium comprising logic instructions for:
  extracting program specific information from the packetized, multi-program transport stream;
  parsing the program specific information to obtain at least one program association table and program map table associated with a program in the packetized, multi-program transport stream; and
  configuring an output of a demultiplexer based on the at least one program association table and program map table, wherein the external application retrieves transport stream packets that are mapped to the program map table and configures the demultiplexer output pins to output at least one program of interest from the retrieved transport stream packets.

21. A computer system, comprising:
a display;
a user-input device;
a processor capable of executing logic instructions; and
a computer readable medium comprising logic instructions for:
   obtaining a plurality of program identifiers from a received MPEG-2 transport stream;
   retrieving from the program identifier at least one program association table;
      retrieving from the program association table at least one program map table; and
   presenting the plurality of program association table and program map table in a user interface;
   receiving, from the user interface, a signal indicating a program association table and program map table selected from the plurality of program identifiers in the MPEG-2 transport stream; and
   configuring a MPEG-2 demultiplexer based on the selected program association table and program map table, wherein transport stream packets are mapped to demultiplexer output pins to output at least one program of interest from the retrieved transport stream packets.

22. An apparatus, comprising:
a demultiplexer filter implemented as a software object in a filter graph that receives portions of a packetized, multi-program transport stream including program specific information about data in the packetized, multi-program transport stream; and
a parser filter implemented as a software object in a filter graph that extracts, from the program specific information, at least one program association table and program map table associated with data in the packetized, multi-program transport stream;
wherein the parser filter provides at least one program identifier to an external application, wherein the external application retrieves transport stream packets that are mapped to the program map table and configures a demultiplexer output pins to output at least one program of interest from the retrieved transport stream packets.

23. The apparatus of claim 22, wherein the parser filter supports an API for retrieving program specific information from the transport stream.

24. The apparatus of claim 22, wherein the external application comprises a user interface for displaying portions of the extracted program information.

* * * * *